United States Patent
Nair et al.

(10) Patent No.: US 12,236,486 B2
(45) Date of Patent: Feb. 25, 2025

(54) SYSTEMS AND METHODS FOR GENERATING CONTEXTUALLY RELEVANT DEVICE PROTECTIONS

(71) Applicant: Assurant, Inc., New York, NY (US)

(72) Inventors: Biju Nair, Long Grove, IL (US); Rajiv K. Dwivedi, Bartlett, IL (US); Sanida D. Bratt, Chicago, IL (US); Joseph Settimi, Evanston, IL (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 15/971,550

(22) Filed: May 4, 2018

(65) Prior Publication Data

US 2019/0340693 A1    Nov. 7, 2019

(51) Int. Cl.
   *G06Q 40/08*   (2012.01)

(52) U.S. Cl.
   CPC .................................. *G06Q 40/08* (2013.01)

(58) Field of Classification Search
   CPC ........ G06Q 40/08; G06Q 10/04; G06Q 10/06; G06Q 30/016; G08B 21/20; G06F 21/554
   See application file for complete search history.

(56) References Cited

U.S. PATENT DOCUMENTS

| | | | |
|---|---|---|---|
| 10,332,249 B2 | 6/2019 | Dwivedi et al. | |
| 10,360,601 B1 | 7/2019 | Adegan | |
| 10,395,221 B1 * | 8/2019 | Price | G06Q 10/20 |
| 2003/0208581 A1 | 11/2003 | Behren et al. | |
| 2005/0046580 A1 | 3/2005 | Miranda-Knapp et al. | |
| 2008/0127313 A1 | 5/2008 | Payne et al. | |
| 2009/0037230 A1 | 2/2009 | Tracy et al. | |
| 2010/0073160 A1 | 3/2010 | Gilmour et al. | |
| 2010/0131303 A1 | 5/2010 | Collopy et al. | |
| 2010/0131304 A1 | 5/2010 | Collopy et al. | |
| 2010/0189887 A1 | 7/2010 | Nielsen et al. | |
| 2010/0332368 A1 * | 12/2010 | Alderucci | G06Q 40/04 705/37 |
| 2011/0161100 A1 | 6/2011 | Peak et al. | |
| 2012/0029947 A1 | 2/2012 | Wooldridge et al. | |
| 2012/0116573 A1 | 5/2012 | Benyoub et al. | |
| 2012/0123806 A1 | 5/2012 | Schumann et al. | |
| 2012/0166229 A1 | 6/2012 | Collins et al. | |
| 2012/0282886 A1 | 11/2012 | Amis | |

(Continued)

FOREIGN PATENT DOCUMENTS

| | | |
|---|---|---|
| CA | 2771286 A1 | 11/2010 |
| GB | 2539779 A | 12/2016 |

(Continued)

OTHER PUBLICATIONS

Weiss, https://www.researchgate.net/publication/268188348 The Impact of Personalization on Smartphone-Based Activity Recognition Article • Jan. 2012 (Year: 2012).*

(Continued)

*Primary Examiner* — Richard C Weisberger
(74) *Attorney, Agent, or Firm* — Alston & Bird LLP (57) ABSTRACT

Systems and methods are disclosed herein that can detect use of a consumer electronics device and that can generate and offer insurance or protection plans that measure, account, and adjust for the use of the consumer electronics device and consumer tendencies while using the consumer electronics device.

17 Claims, 10 Drawing Sheets

(56) References Cited

U.S. PATENT DOCUMENTS

| | | | |
|---|---|---|---|
| 2013/0191213 | A1 | 7/2013 | Beck et al. |
| 2013/0319882 | A1 | 12/2013 | Berkovic |
| 2014/0279168 | A1 | 9/2014 | Malaczynski et al. |
| 2014/0349615 | A1 | 11/2014 | Hsu et al. |
| 2015/0025916 | A1 | 1/2015 | Rodriguez et al. |
| 2015/0113421 | A1 | 4/2015 | Lymer et al. |
| 2015/0178850 | A1 | 6/2015 | Machnicki et al. |
| 2015/0206200 | A1 | 7/2015 | Edmondson et al. |
| 2015/0339736 | A1* | 11/2015 | Bennett ............. G06Q 30/0278 705/306 |
| 2016/0217532 | A1 | 7/2016 | Slavin |
| 2016/0321551 | A1 | 11/2016 | Priness et al. |
| 2016/0343083 | A1* | 11/2016 | Hering ................ G06F 21/50 |
| 2017/0024821 | A1 | 1/2017 | Sherman |
| 2017/0256051 | A1 | 9/2017 | Dwivedi et al. |
| 2018/0068392 | A1* | 3/2018 | Bowes ................ H04W 4/24 |
| 2018/0338187 | A1 | 11/2018 | Ketonen et al. |
| 2019/0164020 | A1 | 5/2019 | Sabripour |
| 2019/0373101 | A1 | 12/2019 | Dotan-Cohen et al. |
| 2020/0074561 | A1 | 3/2020 | Nair et al. |

FOREIGN PATENT DOCUMENTS

| | | | | |
|---|---|---|---|---|
| JP | 2004-227326 | A | 8/2004 | |
| JP | 2005-275532 | A | 10/2005 | |
| JP | 2006-172429 | A | 6/2006 | |
| JP | 2014-064166 | A | 4/2014 | |
| JP | 2017-059968 | A | 3/2017 | |
| JP | 2017-100308 | A | 6/2017 | |
| JP | 6283143 | B1 | 2/2018 | |
| WO | WO-2012037290 | A2 * | 3/2012 | ........... G02B 27/017 |
| WO | 2012/092161 | A2 | 7/2012 | |
| WO | 2016/121838 | A1 | 8/2016 | |
| WO | 2018/003026 | A1 | 1/2018 | |
| WO | 2019/213641 | A1 | 11/2019 | |
| WO | 2019/213642 | A3 | 12/2019 | |

OTHER PUBLICATIONS

Assurant, Inc. SWOT Analysis. May 31, 2017, p. 1-7. 7p. , Database: Business Source Complete (Year: 2017).*

Dang et al. International Journal of Advanced Computer Science and Applications vol. 7. Automatic Fall Detection Using Smartphone Acceleration Sensor (Year: 2016).*

International Search Report and Written Opinion from corresponding PCT application PCT/US2019/030773, dated Jul. 15, 2019.

Alcaraz et al., Critical infrastructure protection: Requirements and challenges for the 21st century, International Journal of Critical Infrastructure Protection, 8:53-66 (2015).

European Search Report and Search Opinion received for EP Application No. 19796447.1, mailed on Dec. 22, 2021, 10 pages.

International Preliminary Report on Patentability received for PCT Patent Application No. PCT/US19/30774, mailed on Nov. 19, 2020, 10 pages.

International Search Report and Written Opinion received for PCT Patent Application No. PCT/US19/30774, mailed on Oct. 30, 2019, 12 pages.

International Preliminary Report on Patentability received for PCT Patent Application No. PCT/US19/30773, mailed on Nov. 19, 2020, 13 pages.

International Search Report and Written Opinion received for PCT Patent Application No. PCT/US19/30773, mailed on Jul. 15, 2019, 13 pages.

EP Office Action Mailed on Aug. 18, 2023 for EP Application No. 19796532, 7 page(s).

Dang Tran Tri et al: "Automatic Fall Detection using Smartphone Acceleration Sensor", (IJACSA) International Journal of Advanced Computer Science and Applications, vol. 7, No. 12, Dec. 1, 2016 (Dec. 1, 2016), pp. 1-442, XP055872270.

European Search Report and Search Opinion received for EP Application No. 19796532.0, mailed on Dec. 22, 2021, 10 pages.

English Translation of JP Office Action dated Jan. 10, 2024 for JP Application No. 2020562127, 4 page(s).

JP Office Action Mailed on Jan. 10, 2024 for JP Application No. 2020562127, 3 page(s).

English Translation of JP Office Action dated May 26, 2023 for JP Application No. 2020562127, 7 page(s).

JP Office Action Mailed on May 26, 2023 for JP Application No. 2020562127, 5 page(s).

JP Office Action, including search report, Mailed on May 26, 2023 for JP Application No. 2020562135, 6 page(s).

EP Office Action Mailed on Jan. 24, 2024 for EP Application No. 19796447, 6 page(s).

* cited by examiner

SYSTEMS AND METHODS FOR GENERATING CONTEXTUALLY RELEVANT DEVICE PROTECTIONS

FIELD

The present invention relates generally to a consumer electronics device. More particularly, the present invention relates to systems and methods that detect use of the consumer electronics device.

BACKGROUND

Many consumer electronics devices are sold at price points that are considered expensive to an average consumer. As a result, the average consumer sometimes chooses to purchase a protection or other insurance plan to protect the consumer electronics device and reimburse the consumer for replacing or repairing the consumer electronics device when lost or damaged.

While many consumers commonly purchase insurance or protections plans, known insurance or protection plans are conventionally based on a retail price of the consumer electronics device, a cost to replace the consumer electronics device, or a cost to repair the consumer electronics device. However, known insurance or protection plans fail to account for use of the consumer electronics device or consumer tendencies while using the consumer electronics device.

In view of the above, there exists a need for systems and methods for generating and offering insurance or protection plans that measure, account, and adjust for use of the consumer electronics device and consumer tendencies while using the consumer electronics device.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods that can detect use of a consumer electronics device and systems and methods that can generate and offer insurance or protection plans that measure, account, and adjust for the use of the consumer electronics device and consumer tendencies while using the consumer electronics device.

In some embodiments, systems and methods disclosed herein can receive or retrieve data from sensors included within the consumer electronics device, analyze the data, and determine whether the data indicates that the consumer electronics device has been dropped. For example, in some embodiments, systems and methods disclosed herein can determine whether the data from an accelerometer included within the consumer electronics device indicates that acceleration of the consumer electronics device is consistent with the consumer electronics device being dropped, such as the data both exceeding a first threshold value and dropping below a second threshold value within a predetermined period of time or the data initially dropping below the second threshold value, subsequently exceeding the first threshold value, and subsequently dropping below the second threshold value within the predetermined period of time. Additionally or alternatively, in some embodiments, systems and methods disclosed herein can determine whether the data from a gyroscope included within the consumer electronics device indicates that a rotation and an orientation of the consumer electronics device is consistent with the consumer electronics device being dropped and strongly impacting a surface.

In some embodiments, systems and methods disclosed herein can identify activities related to the consumer electronics device that pose potential risk of damage to the consumer electronics device. For example, in some embodiments, systems and methods disclosed herein can identify the activities that pose the potential risk of damage to the consumer electronics device based on location data of the consumer electronics device, intended location data of the consumer electronics device, or intended events to be attended by a user of the consumer electronics device.

In some embodiments, systems and methods disclosed herein can monitor user interactions with the consumer electronics device, including the user interactions or a lack of the user interactions with applications executed by the consumer electronics device, to determine a potential risk to the consumer electronics device or other items protected by an insurance or protection plan. In some embodiments, systems and methods disclosed herein can transmit an audible or visual warning message to the user indicative of the user interactions identified as posing the potential risk.

In some embodiments, systems and methods disclosed herein can identify a replacement cost percentage for the consumer electronics device based on a depreciated value of the consumer electronics device and generate and offer a discounted insurance or protection plan when the replacement cost percentage exceeds a predetermined threshold value.

In some embodiments, systems and methods disclosed herein can identify a durability index rating for the consumer electronics device and generate and offer a discounted insurance or protection plan when the durability index rating exceeds a predetermined threshold value. In some embodiments, systems and methods disclosed herein can identify the durability index rating based on extensive testing of various makes and models of consumer electronics devices.

In some embodiments, systems and methods disclosed herein can execute a diagnostics test on the consumer electronics device, determine whether any components of the consumer electronics device are non-functional or broken, and generate and offer a discounted insurance or protection plan when a predetermined number of the components are identified as non-functional. In some embodiments, a value of the discounted insurance or protection plan can be based on which of the components is identified as non-functional and, based on past policy claims data, how often that non-functioning component is broken.

Figure 1:
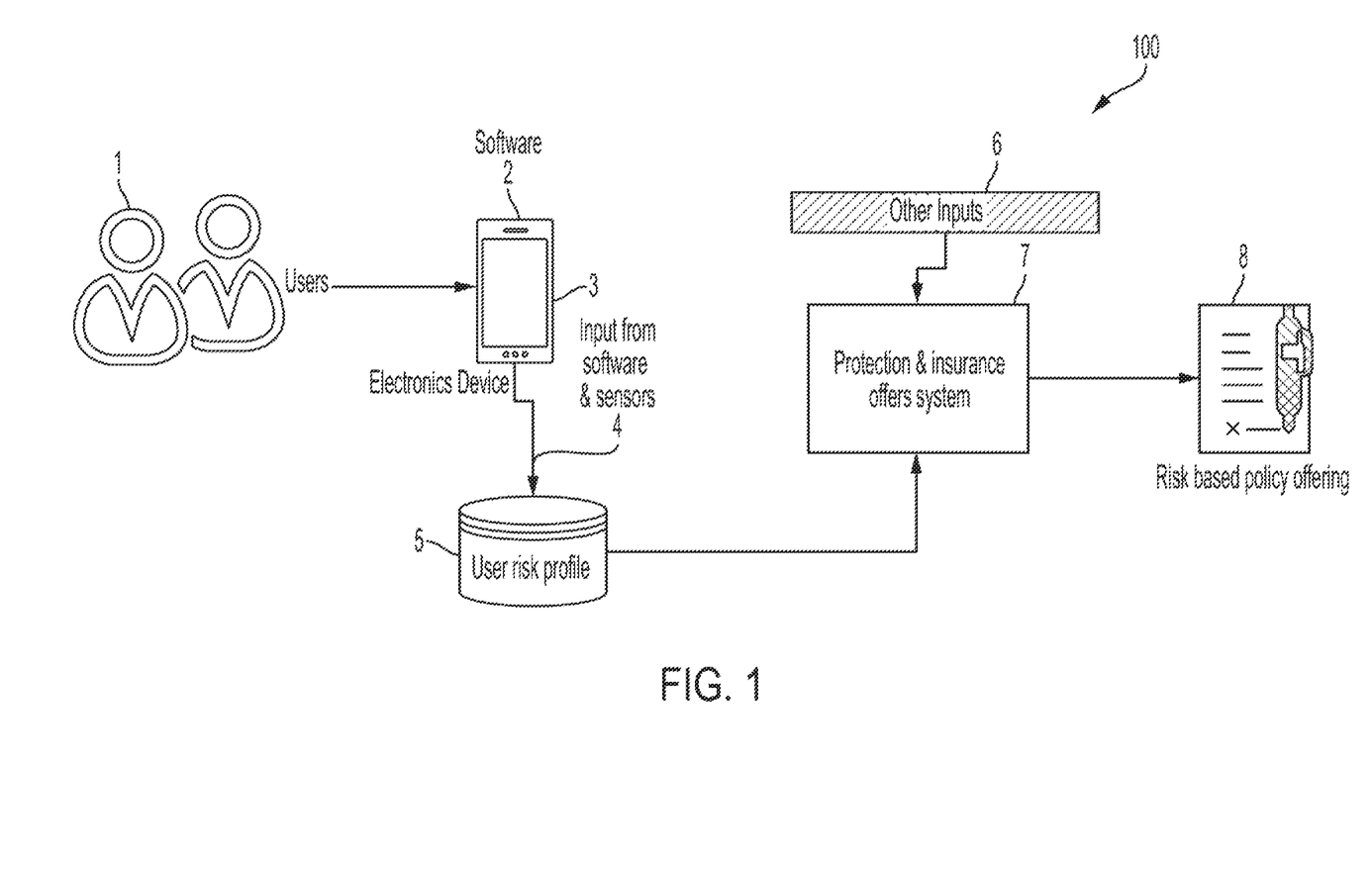
FIG. 1 is a block diagram of a system in accordance with disclosed embodiments.

FIG. 1 is a block diagram of a system 100 in accordance with disclosed embodiments and can implement the methods disclosed herein. As seen, the system 100 can include a consumer electronics device 3 that can be operated by a user 1 and that can execute a software application 2. In some embodiments, the software application 2 can communicate with and receive or retrieve data from one or more sensors 4 included within the consumer electronics device 3. In some embodiments, the consumer electronics device 3 can include a smartphone, a tablet, or a laptop computer. When the consumer electronics device 3 is a smartphone, the consumer electronics device can include up to eight of the sensors 4, including one or more of a touchscreen, an accelerometer, a gyroscope, a magnetometer, a global positioning (GPS) system, a barometer, an ambient light sensor, a proximity sensor, and a fingerprint sensor. Additionally or alternatively, in some embodiments, the sensors 4 can include one or more cameras, which can collect the data when the software 2 includes video analytics software.

In some embodiments, the software application 2 can be stored and executed on the consumer electronics device 3. Alternatively, in some embodiments, the software application 2 can be web-based and can retrieve the data from the sensors 4 when the consumer electronics device 3 navigates to a website universal resource locator (URL) associated with the software application 2 or at periodic intervals identified by the software application 2.

In some embodiments, the software application 2 can generate a user risk profile 5 based on the data received from the sensors 4 and save the user risk profile 5 in a database device. For example, in some embodiments, the software application 2 can use the data from the sensors 4 to determine whether the consumer electronics device 3 has been dropped by the user 1 a predetermined number of times that indicates a propensity for dropping the consumer electronics device 3. Responsive thereto, the software application 2 can generate the user risk profile 5 to indicate that the user 1 has a propensity to drop the consumer electronics device 3, and, therefore, is associated with a predetermined level of risk to insure.

In some embodiments, the software application 2 and the consumer electronics device 3 can transmit the user risk profile 5 to a protection and insurance offering system 7 via a network connection, such as a LTE, 4G, WiFi, or any other Internet-based connection, and in some embodiments, the protection and insurance offering system 7 can include a cloud-based server, which can be accessible at a predetermined URL. In some embodiments, the protection and insurance offering system 7 can also receive or retrieve input data 6 from other sources. For example, the input data 6 can include identifications of locations that present an increased risk to the safety of the consumer electronics device 3, identifications of times and dates of events that present an increased risk to the safety of the consumer electronics device 3, identifications of past interactions of the user 1 with another device, or identifications of any other factors that may impact the risk associated with the user 1 owning and using the consumer electronics device 3.

Based on the user risk profile 5 and the input data 6, the protection and insurance offering system 7 can generate a risk based policy offering 8 that is customized to the user and the consumer electronics device 3. For example, in some embodiments, the risk based policy offering 8 can include a custom price to insure the consumer electronics device 3 for the user 1, and in some embodiments, the risk based policy offering 8 can include terms and a scope of protection for an insurance or protection plan associated with the user 1 and the consumer electronics device 3. In some embodiments, the risk based policy offering 8 can include a provision in a terms of service associated with the risk based policy offering 8 requiring that the software application 2 be installed on the consumer electronics device 2 at all times during the life of the risk based policy offering 8 and that removal of the software application 2 from the consumer electronics device will void insurance protection associated with the risk based policy offering 8.

As disclosed herein, a common and constant risk to the consumer electronics device 3 is that the user 1 will drop the consumer electronics device 3, thereby damaging the consumer electronics device 3. For example, if the user 1 drops the consumer electronics device 3 from a sufficient height and in a specific manner, then a screen of the consumer electronics device 3 may shatter. Thus, an important factor measured by the software application 2 and included in the user risk profile 5 is when and how often the user 1 drops the consumer electronics device 3.

In this regard, the software application 2 can identify a trauma event each time the consumer electronics device 3 is dropped from a height that ends in a hard impact, and the software application 2 can use the trauma event to create the user risk profile 5. In some embodiments, the software application 2 can communicate with the user 1, such as by generating a notification message (e.g. email notification, push notification) that includes one or more suggested proactive actions to prevent future drops. For example, the one or more suggested proactive actions may include the user 1 purchasing a shock-absorbing case for the consumer electronics device 3, a screen protector for the consumer electronics device, or gripping strips that increase an amount of friction on a housing of the consumer electronics device 3 while being held by the user 1. In some embodiments, the notification message may include one or more reasons for the suggested proactive action, such as data that suggests the user 1 drops the consumer electronics device 3 more than average.

As disclosed herein, the software application 2 can identify when the consumer electronics device 3 has been dropped. For example, in some embodiments, the software application 2 can monitor the data from the sensors 4, such as the accelerometer, to determine whether the consumer electronics device 3 has been dropped. In some embodiments, the software application 2 can identify an impact level of the consumer electronics device 3 being dropped to differentiate between a damage-inducing drop when the consumer electronics device 3 impacts a hard surface (e.g. a cement floor) and a harmless drop when the consumer electronics device 3 impacts a soft surface (e.g. a couch). In some embodiments, the software application 2 can validate the impact level using the data collected from sensors 4, such as the accelerometer or the gyroscope.

Figure 2:
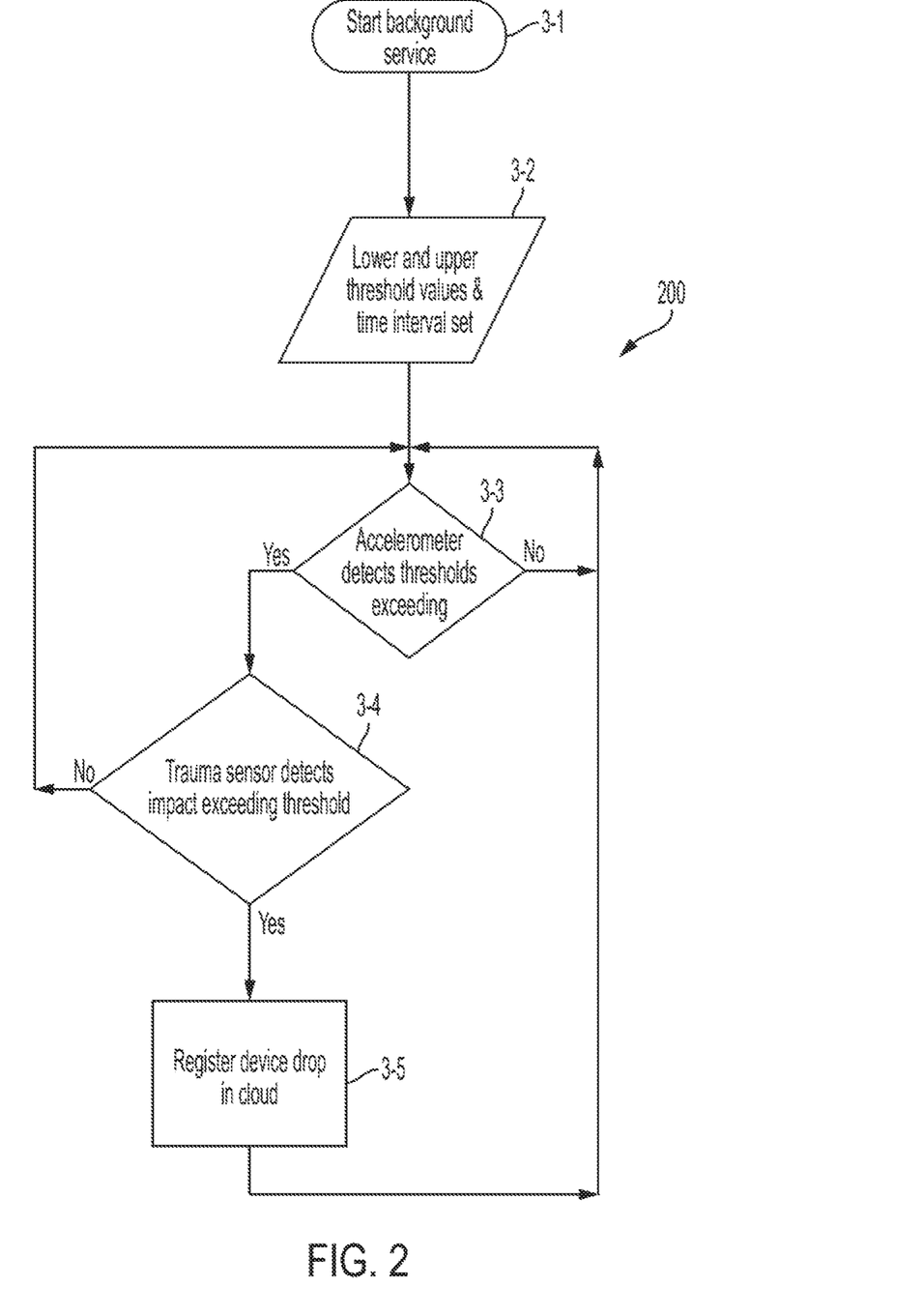
FIG. 2 is a flow diagram of a method for detecting whether an electronics device has been dropped in accordance with disclosed embodiments.

FIG. 2 is a flow diagram of a method 200 for detecting whether the consumer electronics device 3 has been dropped in accordance with disclosed embodiments. As seen, the method 200 can include starting a background service, as in 3-1. For example, the background service can be started by installing the software application 2 on the consumer electronics device 3 for continually monitoring the data from the sensors 4 to detect conditions indicative of a drop. In some embodiments, the background service may be unnoticeable to the user 1 during regular use of the consumer electronics device 3.

The method 200 can also include setting lower and upper threshold values and a time interval, as in 3-2. In some embodiments, the lower and upper threshold values and the time interval can be predetermined, and in some embodiments, the upper threshold can be greater than the lower threshold. For example, the upper threshold value can be set to an acceleration value corresponding with a height at which the consumer electronics device 3 must be dropped to qualify as a damage-inducing drop. Additionally or alternatively, in some embodiments, the lower and upper threshold values can be based on a type of the consumer electronics device 3 on which the software application 2 is installed. For example, an iPhone 8 Plus may be heavier than an iPhone 8 so, when dropped, a force of impact for the iPhone 8 Plus may be higher than the iPhone 8. As such, the software application 2 installed on the iPhone 8 Plus may set the upper threshold value higher than the software application 2 installed on the iPhone 8 sets the upper threshold value. Additionally or alternatively, in some embodiments, the upper and lower threshold values can be identified from the data from the sensors 4, including acceleration values measured by the accelerometer, angular velocity values measured by the gyroscope, and/or orientation values measured by the gyroscope and the magnetometer. In any embodiment, the lower and upper threshold values can be set at values that facilitate identifying drops that follow the same general pattern discussed herein.

The method 200 can also include the software application 2 determining whether the data from the accelerometer is indicative of a drop, that is, whether the data indicates that an acceleration of the consumer electronics device 3 exceeded the upper threshold value and subsequently fell below the lower threshold value within the time interval or whether the data indicates that the acceleration of the consumer electronics device 3 initially fell below the lower threshold value, subsequently exceeded the upper threshold value, and subsequently fell below the lower threshold value, as in 3-3. In some embodiments, the accelerometer can include a tri-axial accelerometer with three axes (x-axis, y-axis, and z-axis) for measuring the data in three directions, and the data from the accelerometer can be measured in meters per second squared. When the accelerometer is the tri-axial accelerometer, the software application 2 can calculate a geometric mean of the data associated with the three axes as follows: $|A_T|=\text{sqrt}(a_x^2, a_y^2, a_z^2)$. When the conditions of 3-3 have not been met, the software application 2 can repeat 3-3. However, when the conditions of 3-3 have been met, the method 200 can continue to 3-4.

Figure 3:
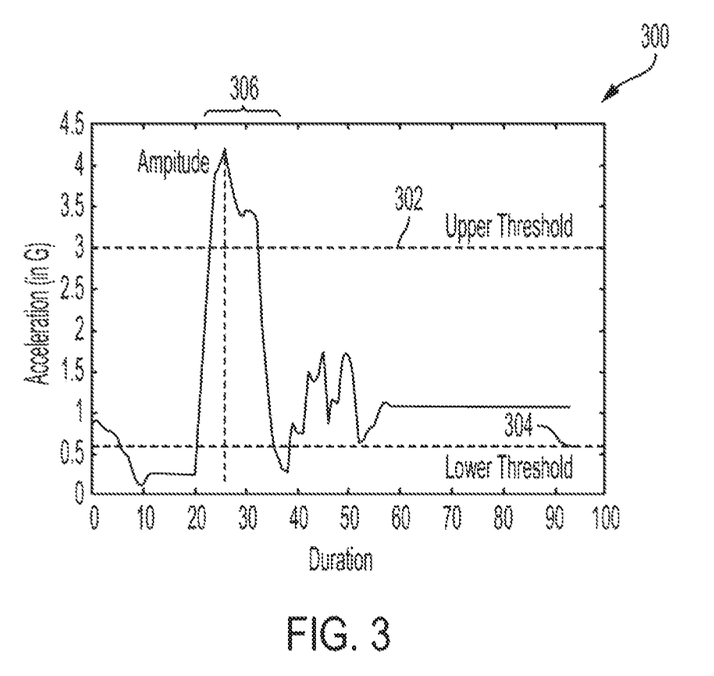
FIG. 3 is a graph plotting accelerometer measurements in accordance with disclosed embodiments.

Pursuant to the method 200, FIG. 3 is a graph 300 plotting accelerometer measurements in accordance with disclosed embodiments and identifies the upper threshold value 302, the lower threshold value 304, and the data indicative of a drop 306. As known by those of ordinary skill in the art, the data from the accelerometer can include the force of gravity (e.g. 9.81 m/s²). Accordingly, when the consumer electronics device 3 is stationary on a surface, the data from the accelerometer can be 9.81. However, when the consumer electronics device is falling downwards, the data from the accelerometer can be 0. In this regard and as seen in FIG. 3, during the drop, the data from the accelerometer can initially fall below the lower threshold value 304 (e.g. accelerometer data=0 during free fall), subsequently exceed the upper threshold value 302 (e.g. accelerometer data=36 upon impacting a surface and bouncing off the surface), and subsequently fall below the lower threshold value 304 (e.g. accelerometer data=0 during free fall after bouncing off the surface) within the time interval (e.g. 20 ms).

In some embodiments, after initially falling below the lower threshold value 304, when the data from the accelerometer subsequently exceeds an intermediate threshold value that is below the upper threshold value 302, the method 200 can determine that the consumer electronics device 3 was dropped on a soft surface and, therefore, that the drop was harmless.

The method 200 can also include the software application 2 determining whether the drop concluded with an impact exceeding an impact threshold value, as in 3-4. For example, in some embodiments, the method 200 can identify an impact level of the consumer electronics device 3 being dropped to differentiate between a damage-inducing drop when the consumer electronics device 3 impacts a hard surface and a harmless drop when the consumer electronics device 3 impacts the soft surface. In this regard, in some embodiments, the method 200 can validate the drop with the data from the sensors 4, such as the data from the gyroscope indicative of the rotation and/or the orientation of the consumer electronics device 3 in azimuth (angle around the x-axis), pitch (angle around the y-axis), and roll (angle around the z-axis) directions ($^\omega X, ^\omega Y, ^\omega Z$). In some embodiments, after the data from the accelerometer exceeds the upper threshold value, the software application 2 can calculate a geometric mean of the rotation of the consumer electronics device 3 in degrees per second as follows: $^\omega T=\text{sqrt}(^\omega x^2, ^\omega y^2, ^\omega z^2)$. Then, the software application 2 can confirm that the drop was a damage-inducing drop when the geometric mean of the rotation and the orientation exceeds the impact threshold value. In some embodiments, the impact threshold value can be set based on rotation and orientation values of the consumer electronics device 3 impacting a hard surface during a drop and/or dropping and inducing damage, wherein such values can be identified via modeling and testing of consumer electronics devices.

When the method 200 confirms that the drop was a damage-inducing drop, the method 200 can continue as in 3-5. However, when the method 200 fails to confirm that the drop was a damage-inducing drop, the method 200 can continue as in 3-3, and the software application 2 can confirm that the drop was a harmless drop.

Figure 4:
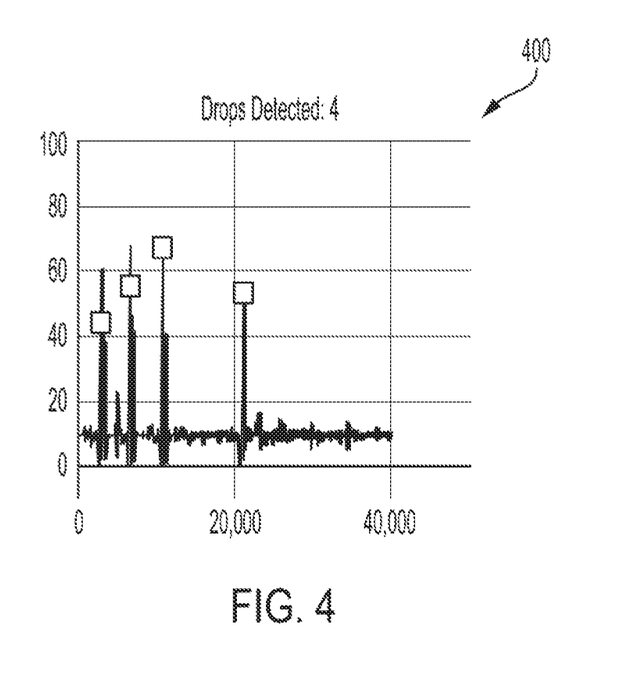
FIG. 4 is a graph plotting a tendency to drop a device in accordance with disclosed embodiments.

Finally, the method 200 can include the software application 2 registering the drop on a cloud server, such as the protection and insurance offering system 7, as in 3-5. In some embodiments, registering the drop can include the software application 2 updating a risk profile 5 for the user 1 and the consumer electronics device 3. In this regard, FIG. 4 is a graph 400 plotting a tendency to drop a device in accordance with disclosed embodiments and identifies four drops over a period of time.

In some embodiments, the software application 2 can set a thrown threshold value that can be lower than the lower threshold value. In these embodiments, when the data from the accelerometer falls below the thrown threshold value, the software application 2 can determine that the consumer electronics device 3 has been thrown, an event that may not be protected by the risk based policy offering 8. Additionally or alternatively, the software application 2 can determine that the consumer electronics device 3 has been thrown upward when the data from the accelerometer increased before initially falling below the lower threshold value.

When the software application 2 determines that the user 1 has a propensity to drop the consumer electronics device 3 (e.g. a number of drops within a time period exceeds a predetermined threshold value), the protection and insurance offering system 7 can generate a notification message to the consumer electronics device 3 that includes an offer to the user 1 to purchase a case or a screen protector and that can be accompanied by data illustrative of the user 1 having the propensity to drop the consumer electronics device 3. In addition, the protection and insurance offering system 7 can increase a price of the risk based policy offering 8 in response to determining that the user 1 has the propensity to drop the consumer electronics device 3 and notify the user 1 as such.

Figure 5:
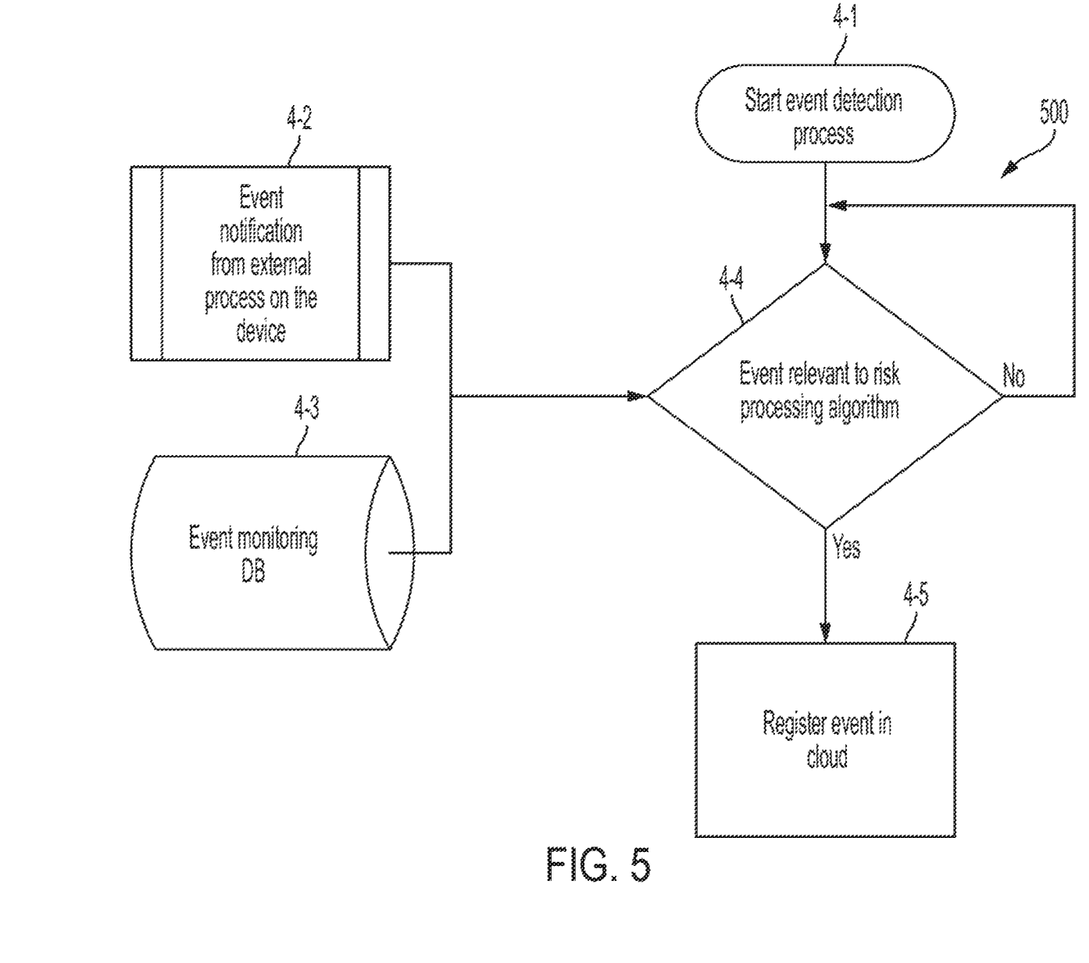
FIG. 5 is a flow diagram of a method for adjusting risk in accordance with disclosed embodiments.

FIG. 5 is a flow diagram of a method 500 for adjusting risk in accordance with disclosed embodiments, for example, by generating a risk profile for the user 1 based on user events and user activities that may affect the risk involved with insuring or protecting the consumer electronics device 3.

As seen, the method 500 can include starting an event detection process, as in 4-1. In some embodiments, the event detection process can include a background service that operates in conjunction with the background service described in connection with FIG. 2. After beginning the event detection process, the method 500 can include the software application 2 or the protection and insurance offering system 7 identifying the user events and the user activities, as in 4-2, and retrieving identified risk scenarios from an event monitoring database, as in 4-3, to determine whether any of the user events and the user activities matches any of the identified risk scenarios, as in 4-4. If no matches are identified, as in 4-4, then the method 500 can include the software application 2 continuing to monitor for the user events and the user activities, as in 4-2, and retrieve the identified risk scenarios, as in 4-3. However, when the method 500 identifies a match between one of the user events and the user activities and one of the identified risk scenarios, the method 500 can include the software application 2 registering the one of the user events and the user activities identified as in 4-3 on the cloud server, as in 4-5.

As an example, one of the identified risk scenarios can include the user 1 attending a concert, a sporting event, a street festival, or a political march that has a high risk for the consumer electronics device 3 because the user 1 is likely to capture a video or a photograph while holding the consumer electronics device 3 at an elevated height or because large crowds associated with such a high risk event increase the likelihood of the consumer electronics device 3 being stolen. The software application 2 can retrieve the identified risk scenario (e.g. concert attendance) and monitor the activities of the user 1 through the consumer electronics device 3 to determine whether the user 1 has purchased or is purchasing a ticket to the concert, for example, by monitoring the user's 1 internet browsing, determining that the consumer electronics device 3 received an email confirming a ticket purchase, or by monitoring the user's 1 text messages. In response to detecting that the user 1 purchased the ticket to the concert, for example, the software application 2 can identify a match with the identified risk scenario and can register the user purchasing the concert ticket purchase on the cloud server, as in 4-5.

As another example, one of the identified risk scenarios can include the user 1 traveling internationally or to another high risk location. The software application 2 can retrieve the identified risk scenario (e.g. international travel) and monitor the activities of the user 1 to determine whether the user 1 purchased a ticket to, reserved lodging in, or is physically present in an international location, a specific country particularly associated with risk (e.g. a developing country), or a risky or unsafe geographic location (e.g. a high crime neighborhood), for example, by monitoring a destination address entered by the user 1 into navigation software (e.g. Waze, Google Maps) or by monitoring GPS coordinates of the consumer electronics device 3 relative to GPS coordinates of the international location, the specific country particularly associated with risk, or the risky or unsafe geographic location. In response to detecting the user 1 purchasing the ticket to the international location, for example, the software application 2 can identify a match with the identified risk scenario and can register the user 1 purchasing the ticket to the international location on the cloud server, as in 4-5.

In some embodiments, when the software application 2 determines that one of the user events and the user activities matches one of the identified risk scenarios, the protection and insurance offering system 7 can generate a notification message to the consumer electronics device 3 that includes an offer to the user 1 to purchase added protection or insurance at any time prior to the user attending or travelling to the one of the identified risk scenarios to provide enhanced protection or heightened insurance for any or all portions of the user attending or travelling to the one of the identified risk scenarios.

Figure 6:
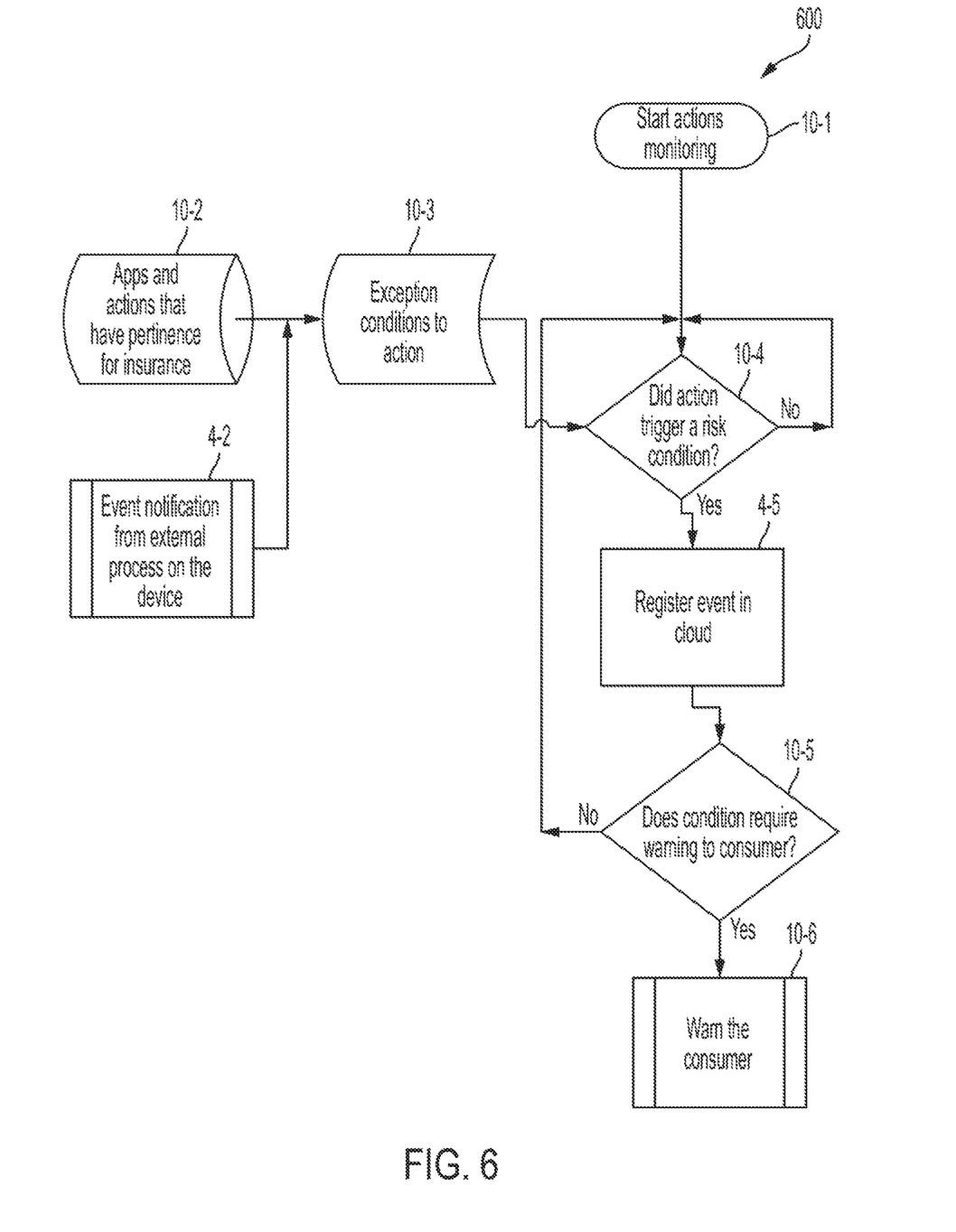
FIG. 6 is a flow diagram of a method for adjusting risk and generating warnings in accordance with disclosed embodiments.

Like FIG. 5, FIG. 6 is a flow diagram of a method 600 for adjusting risk and generating warnings in accordance with disclosed embodiments, for example, by monitoring the user activities of the user 1 within other applications executed by the consumer electronics device 3. In doing so, the method 200 can identify risky behavior of the user 1 through the consumer electronics device 3 and offer an insurance or protection plan through the protection and insurance offering system 7 for more than just the consumer electronics device 3. For example, the protection and insurance offering system 7 can offer insurance or protection for data stored on the consumer electronics device 3, stationary electronics in a home of the user 1, or actions of the user 1.

As seen, the method 600 can include starting an actions monitoring process, as in 10-1. In some embodiments, the actions monitoring process can include a background service that operates in conjunction with the background service described in connection with FIG. 2 or the event detection process described in connection with FIG. 5. After beginning the actions monitoring process, the method 600 can include the software application 2 identifying applications and actions that have a pertinence for insurance from a database, as in 10-2, and identifying the user events and the user activities, as in 4-2, to determine whether any of the user events and the user activities matches any of the applications and actions that have a pertinence for insurance, as in 10-3. The method 600 can determine the user activities by monitoring a user interface or touchscreen of the consumer electronics device 3. If, as in 10-4, none of the user events and the user activities identified as in 4-2 matches the applications and the actions identified as in 10-2, then the method 600 can include the software application 2 continuing to monitor for the user events and the user activities, as in 4-2. However, if, as in 10-4, one of the user events and the user activities identified as in 4-2 matches one of the applications and the actions identified as in 10-2, then the method 600 can include the software application 2 registering the one of the user events and the user activities identified as in 4-3 (see FIG. 5 on the cloud server, as in 4-5.

Finally, the method 600 can include determining whether the one of the user events and the user activities identified as in 4-2 requires a notification message for warning the user 1, as in 10-5. If so, then the notification message can be generated and audibly or visibly presented to the user 1, as in 10-6.

As an example, one of the applications and the actions identified as in 10-2 can include an application that controls a home security system of the user 1. When the software application 2 determines, through GPS data, that the user 1 is away from home, the software application 2 can determine whether the user 1 has aimed the home security system via the application that controls the home security system. When the user 1 has failed to arm the home security system via the application that controls the home security system, the software application 2 can generate a notification message to remind the user 1 to arm the home security system via the application that controls the home security system. Failure to consistently arm the home security system or respond to reminders to do so can result in increased costs in the risk based policy offering 8.

As another example, one of the applications and the actions identified as in 10-2 can include an application that backs up data stored on the consumer electronics device 3. The software application 2 can monitor the user 1 backing up the consumer electronics device 3 via the application that backs up data stored on the consumer electronics device 3, and upon a failure to backup within a predetermined period of time, the software application 2 can offer a service to back up the data stored on the consumer electronics device 3 via the risk based policy offering 8 and/or automatically back up the consumer electronics device 3.

Figure 7:
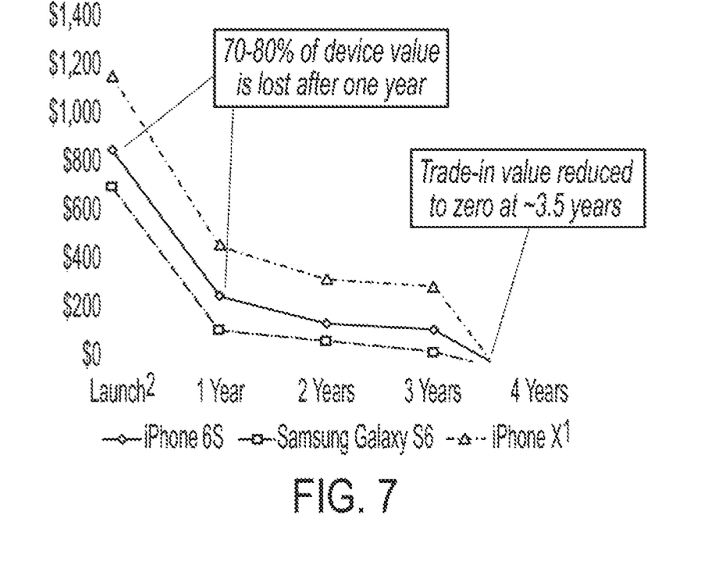
FIG. 7 is a graph plotting device depreciation in accordance with disclosed embodiments.

Generally, the cost to repair or replace the consumer electronics device 3 drops precipitously over time. For example, FIG. 7 is a graph plotting device depreciation for an iPhone 6s mobile device, an iPhone X mobile device, and a Samsung Galaxy S6 mobile device. As shown in FIG. 7, 70-80% of a device's value is lost after one year. Accordingly, systems and methods disclosed herein can offer a discounted insurance plan based on the device depreciation.

Figure 8:
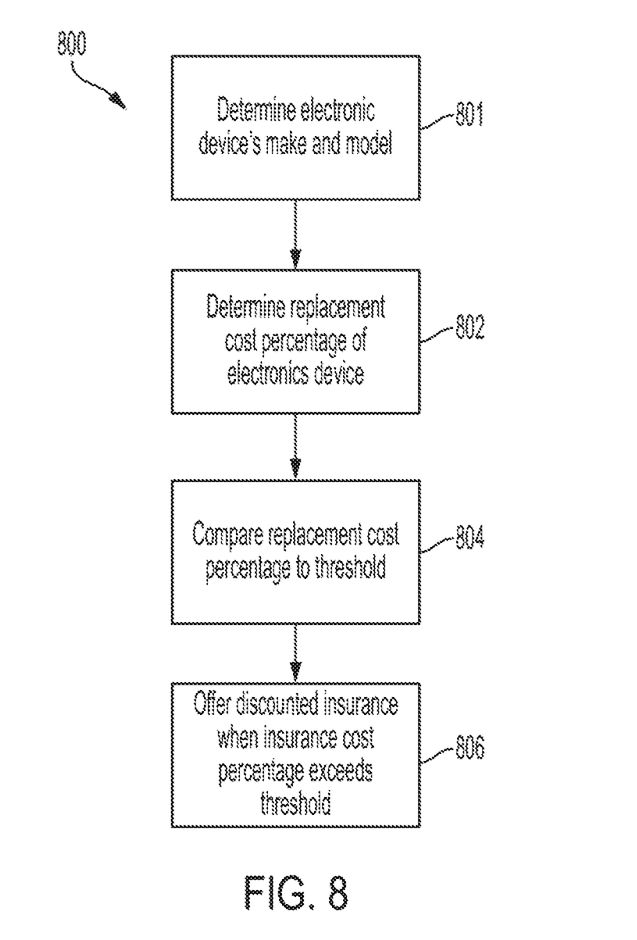
FIG. 8 is a flow diagram of a method for accounting for device depreciation in accordance with disclosed embodiments.

FIG. 8 is a flow diagram of a method 800 for accounting for device depreciation in accordance with disclosed embodiments, for example, by basing a price of an insurance offering on depreciated value. For example, the consumer electronics device 3 can depreciate from a launch date regardless of when the consumer electronics device 3 was purchased because newer versions are always being developed. In this regard, the iPhone 8 launched in October, 2017 at a release price of $750 and continued to sell at that price for an extended period of time thereafter. Nevertheless, a value of the iPhone 8 depreciated approximately 1% per week with a floor determined by demand in the marketplace.

As seen in FIG. 8, the method 800 can include determining a make and a model of the consumer electronics device, as in 801, and identifying a replacement cost percentage of the consumer electronics device 3, as in 802. In some embodiments, the replacement cost percentage can be identified as follows:

$$\text{Replacement cost percent reduction} = \frac{(\text{release price} - ASP)}{\text{release price}} * 100$$

where the release price can be a retail price of the consumer electronics device 3 when the consumer electronics device 3 was first launched and where ASP can be an average selling price of the consumer electronics device 3 on a secondary market. ASP can be updated monthly or at some other periodic interval. In some embodiments, the method 800 can factor additional variables into the replacement cost percentage, such as months since the launch date, device attributes, seasonal effects, macro variables, and worldwide or geographical calamities (e.g. political turmoil that affects trade or a typhoon in Asia that halts trading, thereby impacting a supply of consumer electronics devices in North America), each of which can be assigned a coefficient and incorporated into the equation used for identifying the replacement cost percentage.

Then, the method 800 can include comparing the replacement cost percentage to a threshold value as in 804. When the replacement cost percentage exceeds the threshold value, the method 800 can include extending a discounted insurance offering to the user 1, as in 806. For example, if a smartphone was purchased on Jan. 1, 2018 for 1,000 (e.g. release price) and is valued on Dec. 1, 2019 at $300 (e.g. ASP), then the replacement cost percentage can be 70%, and the method 800 can offer the discounted insurance offering with a 50% discount.

Some technology for consumer electronics devices can increase a durability of the consumer electronics device 3. For example, some smartphones can include organic light emitting diode (OLED) displays. In addition to higher display quality, OLED displays can have higher durability and a lower propensity for cracks and scratches. Indeed, testing has shown that an iPhone 7 having an OLED screen breaks only 6% of the time when dropped from a distance of ten feet whereas an iPhone 6 having an LCD screen breaks 74% of the time when dropped from the same distance and that the iPhone 7 has a decreased chance of damage to a back glass, a back camera, a front camera, and a loud speaker as compared to the iPhone 6. Accordingly, systems and methods disclosed herein can offer a discounted insurance plan based on device durability.

Figure 9:
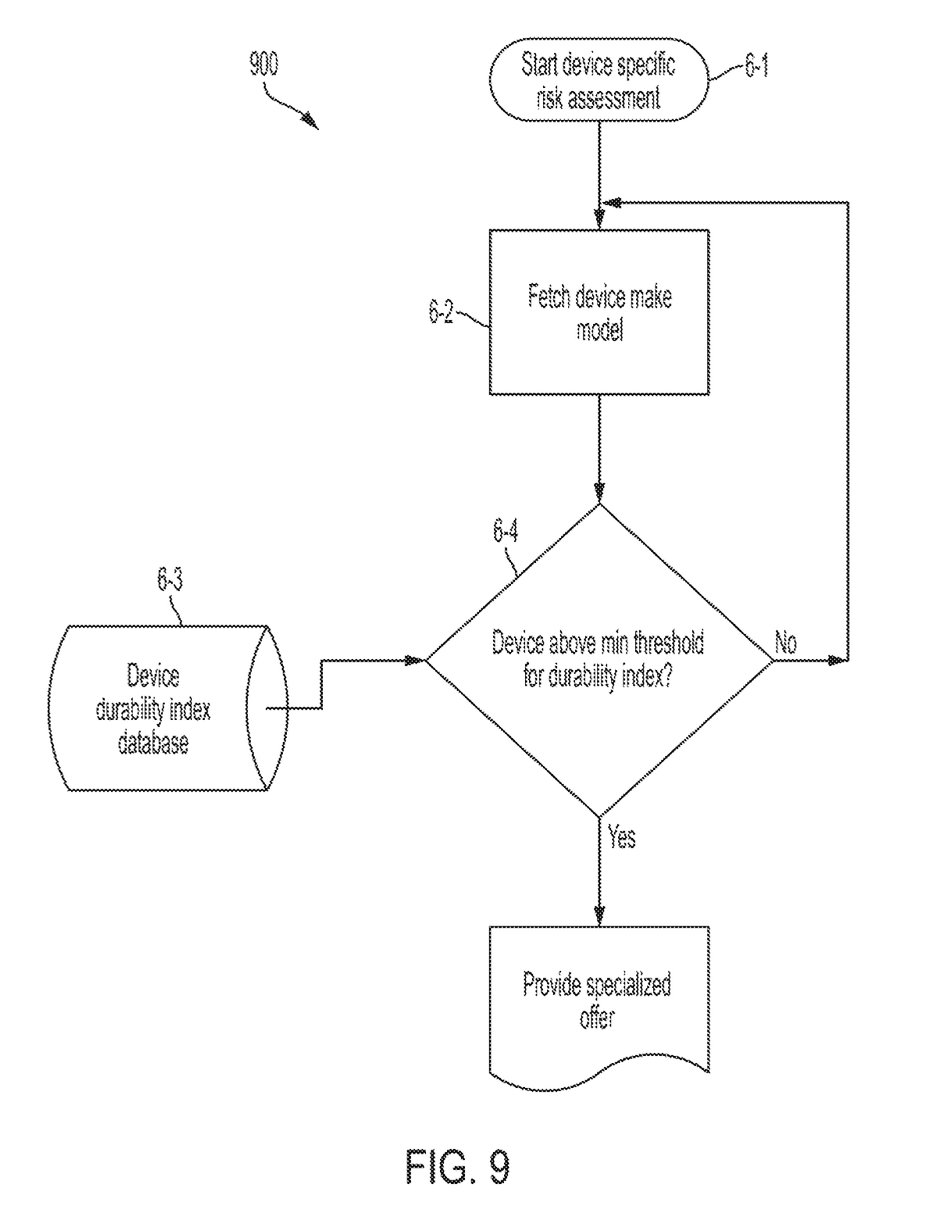
FIG. 9 is a flow diagram of a method for accounting for device durability in accordance with disclosed embodiments.

FIG. 9 is a flow diagram of a method 900 for accounting for device durability in accordance with disclosed embodiments, for example, by basing a price of an insurance offering on the device durability. As seen, the method 900 can include starting a risk assessment process, as in 6-1. In some embodiments, the risk assessment process can include a background service that operates in conjunction with the background service described in connection with FIG. 2, the event detection process described in connection with FIG. 5, or the actions monitoring process 10-1 described in connection with FIG. 7. After starting in the risk assessment process, the method 900 can include determining a make and a model of the consumer electronics device 3, as in 6-2, for example, by referencing data stored on the consumer electronics device 3, a profile of the user 1 stored by the protection and insurance offering system 7, or a TCP/IP packet sent over the Internet. Then, the method 900 can include retrieving a device durability index rating associated with the make and the model from a device durability index database, as in 6-3, and determining whether the device durability index rating exceeds a predetermined threshold value, as in 6-4. When the device durability index rating exceeds the predetermined threshold value, as in 6-4, the method 900 can include the protection and insurance offering system 7 offering a discounted rate.

In some embodiments, systems and methods disclosed herein can also include creating and populating the device durability index database with a respective device durability index rating for each of a plurality of makes and each of a plurality of models based on significant diagnostic testing of the plurality of makes and the plurality of models and aggregate data thereof. Additionally or alternatively, systems and methods disclosed herein can identify the respective device durability rating for each of the plurality of makes and each of the plurality of models from a respective part durability rating for each of a plurality of parts forming a respective device.

Figure 10:
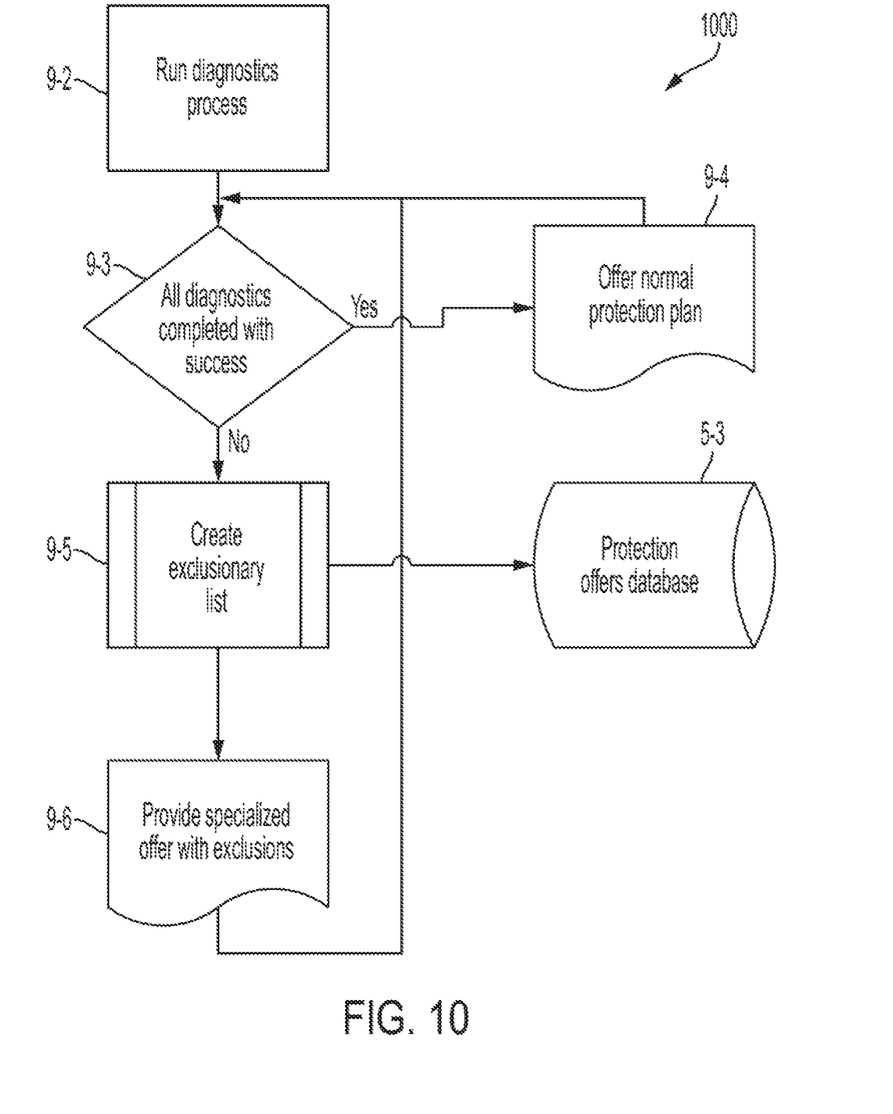
FIG. 10 is a flow diagram of a method for generating a protection plan based on device diagnostics in accordance with disclosed embodiments.

In some situations, the consumer electronics device 3 may be broken, but the user 1 may wish to protect remaining functional components of the consumer electronics device 3. FIG. 10 is a flow diagram of a method 1000 for generating a protection plan based on device diagnostics in accordance with disclosed embodiments, for example, by generating a specialized insurance plan based on results of a diagnostics test.

As seen, the method 1000 can include the software application 2 executing a diagnostics test, as in 9-2 and, based on results of the diagnostics test, determining whether all components of the consumer electronics device 3 are functional, as in 9-3. When the diagnostics test indicates that all components of the consumer electronics device 3 are fully functional, the method 1000 can include the software application 2 generating a report indicative thereof, and the protections and insurance offering system 7 can offer a standard rate insurance plan, as in 9-4. However, when the diagnostics test indicates that one or more of the components of the consumer electronics device 3 is non-functional, the software application 2 can generate a report that identifies an exclusionary list that includes the components of the consumer electronics device 3 that failed the diagnostics test, as in 9-5. Then, the method 1000 can include the software application 2 transmitting the exclusionary list to the protections and insurance offering system 7, which can use the exclusionary list to reference a protection offering database, as in 5-3, and provide a specialized offer with exclusions, as in 9-6.

For example, if the diagnostics test reveals that a front camera of the consumer electronics device 3 is non-functional, then the protection and insurance offering system 7 can offer an insurance plan that excludes protection of the front camera and is discounted accordingly. In some embodiments, an amount of a discount can be based on a percentage of insurance claims that claim damage to such a non-functional component (e.g. the front camera). For example, if relatively few insurance claims claim damage to the front camera (e.g. 10%), then a price of the insurance plan can be discounted a relatively small amount (e.g. 5% discount). Alternatively, if a screen of the consumer electronics device 3 is cracked and, therefore, the non-functional component, and a relatively high number of insurance claims claim damage to the screen (e.g., 75%), then the discount can be higher (e.g. 45% discount).

In some embodiments, the discount can be based on a relative value of the non-functional component toward an overall value of the consumer electronics device 3. Additionally or alternatively, in some embodiments, the discount can be based on a price to repair the non-functional component. For example, if the price to repair the non-functional component is higher than functioning components of the consumer electronics device 3, then the discount can be higher than if the price to repair the non-functional component were lower than the functioning components.

The systems and methods disclosed herein present a substantial advancement over the prior art by identifying a price to insure a consumer electronics device based on data from sensors of the consumer electronics device itself. Furthermore, the systems and methods disclosed herein improve upon the prior art by continually monitoring and detecting data related to risk-creating events and actions of the consumer electronics device, the health of the consumer electronics device, and the overall condition of the consumer electronics device via a software application executing and operating in the background of the consumer electronics device without disrupting other functions or applications executed by the consumer electronics device. Finally, the systems and methods disclosed herein are an improvement to the prior art because the systems and methods disclosed herein interact with the sensors of the consumer electronics device itself, thereby facilitating the consumer electronics device regularly monitoring its own health to protect itself from damage.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method of automatic consumer electronics device protection, the method comprising:
configuring, via at least one processor, a first software application operating on a consumer electronics device to gather first data from the consumer electronics device, the first data comprising sensor data generated via at least two sensors of the consumer electronics device, the at least two sensors comprising a tri-axial accelerometer and a gyroscope;
electronically interacting, via the at least one processor, with the first software application operating on the consumer electronics device to gather the first data from the consumer electronics device;
receiving, via the at least one processor, the first data from the first software application;
processing, via the at least one processor, at least a first portion of the sensor data indicative of an acceleration of the consumer electronics device to determine that the acceleration of the consumer electronics device indicates a drop;
processing, via the at least one processor, at least the first portion of the sensor data to determine a geometric mean of rotation based at least in part on the first portion of the sensor data;
determining, via the at least one processor, that the geometric mean of rotation satisfies an impact threshold value;
in response to determining that the geometric mean of rotation satisfies the impact threshold value:
(i.) saving first information associated with the drop; and
(ii.) initiating a display of a first notification on a display device of the consumer electronics device, wherein the first notification includes a warning indicating information associated with the drop of the consumer electronics device;

determining, via the at least one processor, that a timeframe from a last backup of the consumer electronics device exceeds a time threshold value; and causing automatic initiation, via the at least one processor, of a new backup of the consumer electronics device in response to a determination that the timeframe from the last backup of the consumer electronics device exceeded the time threshold value.

2. The method of claim 1, further comprising:

electronically interacting, via the at least one processor, with the first software application to gather second data from the tri-axial accelerometer of the consumer electronics device; and parsing, via the at least one processor, the second data to determine whether the second data exceeds a first threshold and subsequently falls below a second threshold within a first time period and, responsive thereto, (1) saving second information indicating that the consumer electronics device has experienced a drop event and (2) initiating a display of a second notification on the display device, wherein the second information indicates that the drop event corresponds to the consumer electronics device having been dropped.

3. The method of claim 2, further comprising:

determining, via the at least one processor, that the second data indicates a drop event when the second data falls below a third threshold that is lower than the second threshold or when the second data increases before exceeding the first threshold, wherein the second information indicates that the drop event corresponds to the consumer electronics device having been thrown.

4. The method of claim 2, further comprising:

receiving, via the at least one processor, third data from a second sensor of the consumer electronics device;

determining, via the at least one processor, whether the third data exceeds a third threshold; and in response to the third data exceeding the third threshold, saving third information indicating that the consumer electronics device impacted a hard surface after being dropped.

5. The method of claim 4, wherein the second sensor is the gyroscope.

6. The method of claim 1, further comprising:

electronically interacting, via the at least one processor, with the first software application to gather second data from a touchscreen of the consumer electronics device, wherein the warning is based at least in part on the second data.

7. The method of claim 1, further comprising:

monitoring, via the first software application, at least one other software application executed via the consumer electronics device to detect at least second data comprising Internet browsing activity, email activity, or user interaction associated with the consumer electronics device via the at least one other software application executed via the consumer electronics device, wherein the warning is based at least in part on the second data.

8. The method of claim 1, further comprising:

electronically interacting, via the at least one processor, with the first software application to gather second data from the consumer electronics device, wherein the second data indicates a lack of interaction by the user with a second software application associated with the consumer electronics device; and parsing, via the at least one processor, the second data to determine whether the second data indicates or is associated with a risk and, responsive thereto, (1) saving second information indicating that the consumer electronics device has been exposed to the risk and (2) initiating a display of a second notification on the display device.

9. The method of claim 1, further comprising:

executing, via the consumer electronics device, at least a second application simultaneously with the first software application operating on the consumer electronics device, wherein the first software application continually gathers the first data in the background during operation of the second application.

10. The method of claim 1, wherein processing at least the first portion of the sensor data indicative of the acceleration of the consumer electronics device to determine that the acceleration of the consumer electronics device indicates the drop comprises:

processing the first portion of the sensor data to detect that that the first portion of the sensor data, within a first time period:
initially falls below a lower threshold value, subsequently exceeds an upper threshold value without exceeding an intermediate threshold value below the upper threshold value, and subsequently falls below the lower threshold value.

11. The method of claim 10, further comprising:

processing a second portion of the sensor data to detect that the second portion of the sensor data initially falls below a threshold value, and subsequently exceeds the intermediate threshold value that is below the upper threshold value; and in response to detecting that the second portion of the sensor data initially falls below the threshold value and subsequent exceeds the intermediate threshold value, ignoring the second portion of the sensor data as harmless.

12. The method of claim 10, further comprising:

automatically setting the first time period based at least in part on a device type associated with the consumer electronics device.

13. The method of claim 10, further comprising:

automatically detecting, via the first software application operating on the consumer electronics device, a device type associated with the consumer electronics device; and automatically setting the intermediate threshold value based at least in part on the device type associated with the consumer electronics device.

14. The method of claim 1, further comprising:

automatically detecting, via the first software application operating on the consumer electronics device, device information associated with the consumer electronics device, the device information comprising a make and/or a model of the consumer electronics device; and automatically setting the impact threshold value based at least in part on the device information associated with the consumer electronics device.

15. The method of claim 1, further comprising:

processing, via the at least one processor, at least the first portion of the sensor data to determine an orientation based at least in part on the first portion of the sensor data; and determining, via the at least one processor, that the orientation satisfies the impact threshold value, wherein the first information is saved and the first notification is displayed in response to determining that the orientation satisfies the impact threshold value.

16. The method of claim 1, further comprising:

storing data indicative of the drop as a trauma event associated with a risk profile corresponding to the consumer electronics device, wherein the warning indicates information configured to proactively prevent a future drop based at least in part on the risk profile.

17. The method of claim 1, wherein the geometric mean of rotation is a speed of rotation.

* * * * *